United States Patent
Puli et al.

(10) Patent No.: US 10,440,001 B2
(45) Date of Patent: Oct. 8, 2019

(54) METHOD TO SECURELY AUTHENTICATE MANAGEMENT SERVER OVER UN-ENCRYPTED REMOTE CONSOLE CONNECTION

(71) Applicant: Dell Products, LP, Round Rock, TX (US)

(72) Inventors: AppaRao Puli, Bangalore (IN); Harsha S, Bangalore (IN); Rajeshkumar I. Patel, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 328 days.

(21) Appl. No.: 14/307,808

(22) Filed: Jun. 18, 2014

(65) Prior Publication Data
US 2015/0371032 A1   Dec. 24, 2015

(51) Int. Cl.
*H04L 29/06* (2006.01)
*G06F 21/36* (2013.01)
*H04L 12/24* (2006.01)

(52) U.S. Cl.
CPC .............. *H04L 63/08* (2013.01); *G06F 21/36* (2013.01); *H04L 41/28* (2013.01)

(58) Field of Classification Search
CPC .......... G06F 21/46; H04L 63/08; H04L 67/42
See application file for complete search history.

(56) References Cited

U.S. PATENT DOCUMENTS

| | | | |
|---|---|---|---|
| 7,124,435 B1 | 10/2006 | Richard | |
| 7,353,415 B2 | 4/2008 | Zaretsky et al. | |
| 7,721,096 B2 | 5/2010 | Chiasson et al. | |
| 2003/0120918 A1 | 6/2003 | VanDer Kamp | |
| 2004/0193695 A1* | 9/2004 | Salo | G06F 21/6218 709/216 |
| 2005/0052406 A1* | 3/2005 | Stephanick | G06F 3/0236 345/156 |
| 2009/0007001 A1* | 1/2009 | Morin | G06F 3/0237 715/773 |
| 2009/0037581 A1* | 2/2009 | Richardson | H04L 67/08 709/224 |
| 2010/0214267 A1* | 8/2010 | Radivojevic | G06F 1/1616 345/175 |
| 2013/0097681 A1 | 4/2013 | Jaber et al. | |

(Continued)

OTHER PUBLICATIONS

"Authenticating connections to VNC Server," Chapter 7, Making Connections Secure, RealVnc, © 2002-2014 http://www.realvnc.com/products/vnc/documentation/5.0/guides/user/aj1074738.html.

(Continued)

*Primary Examiner* — Amir Mehrmanesh (74) *Attorney, Agent, or Firm* — Larson Newman, LLP (57) ABSTRACT

A Virtual network computing (VNC) server receives a client launch request from a VNC client and provides a log-in page for display at the VNC client. The log-in page includes a graphical representation of a keyboard having a plurality of keys. Individual key designations at the keyboard are unique and are generated randomly in response to the client launch request. The VNC server receives pointing device movement coordinates from the VNC client; the movement coordinates indicating selection of individual keys at the keyboard by a user of the VNC client.

20 Claims, 4 Drawing Sheets

(56) References Cited

U.S. PATENT DOCUMENTS

| | | | | |
|---|---|---|---|---|
| 2013/0139248 A1* | 5/2013 | Rhee | ..................... | G06F 3/0346 |
| | | | | 726/19 |
| 2014/0096201 A1* | 4/2014 | Gupta | ................... | H04W 12/06 |
| | | | | 726/4 |
| 2014/0189135 A1* | 7/2014 | Lawson | .............. | H04L 63/0272 |
| | | | | 709/227 |

OTHER PUBLICATIONS

"X11vnc: a VNC server for real X displays; line commands options," Karl Runge; Nov. 21, 2013 http://www.karlrunge.com/x11vnc/x11vnc_opts.html.

* cited by examiner

METHOD TO SECURELY AUTHENTICATE MANAGEMENT SERVER OVER UN-ENCRYPTED REMOTE CONSOLE CONNECTION

FIELD OF THE DISCLOSURE

This disclosure generally relates to information handling systems, and more particularly relates to securely authenticating a management server over an un-encrypted remote console connection.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. An information handling system can include components that are configured to support administration of the system from a remote location over a communication network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Administration of an information handling system is often performed remotely over a communication network. For example, an information handling system can include a service processor through which a technician can gain access to the system to perform maintenance and other administrative tasks. The service processor can include a network interface that is connected to a communications network. For example, the service processor can include an Ethernet interface providing access to the Internet. The technician can establish remote communication with the information handling system using a Virtual network computing (VNC) system. VNC is a graphical desktop sharing system that uses the Remote Frame Buffer (RFB) protocol to remotely control another computer. VNC supports the Secure Sockets Layer (SSL) protocol. SSL is a cryptographic protocol which provides communication security over the Internet. If servers and clients do not natively support SSL, SSL tunneling can be provided using a computer program, such as Stunnel. However, there can be occasions where an encrypted communications network is not available. Techniques disclosed herein facilitate secure authentication of a management server or UNIX credentials over an un-encrypted Remote console connection.

As disclosed herein, a VNC server operating at a service processor of an information handling system can provide a graphical interface to a VNC client that includes a virtual keyboard through which a user of the VNC client can enter log-in information using a mouse or other pointing device. The virtual keyboard can include a set of keys, each key associated with a unique alphanumeric or special character designation. The key designations are dynamic, generated randomly by a VNC server in response to a request to launch a VNC session by a VNC client. Each time the VNC server receives a request from a VNC client to launch a VNC session; the VNC server can provide a virtual keyboard having uniquely randomized key-map designations. As the user of the VNC client manipulates the pointing device to enter log-in credentials, the VNC server receives a sequence of coordinates identifying which keys are being selected by the user. Knowing the randomly generated key-mapping provided to the VNC client, the VNC server can decode the sequence of coordinates to determine the individual characters of the log-in credentials.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
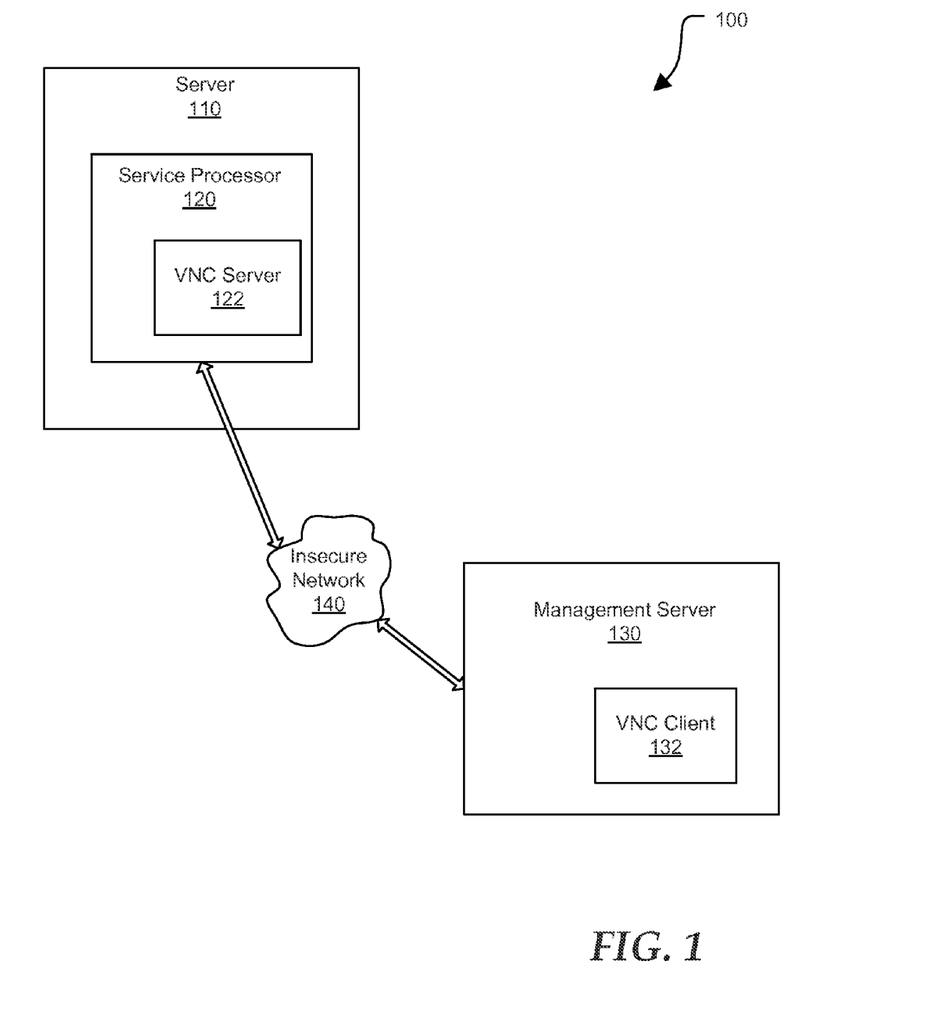
FIG. 1 is a block diagram illustrating an information handling system including a service processor according to an embodiment of the present disclosure.

FIG. 1 shows an information handling system 100 according to a specific embodiment of the present disclosure. System 100 includes a server 110 that is coupled to a management server 130 by a network 140. Server 110 includes a service processor 120. Service processor 120 may also be referred to as a side-band processor, an out-of-band processor, a management controller, and the like. An example of a service processor is the integrated Dell Remote Access Controller (iDRAC). A service processor can be configured to interface with baseboard management controller (BMC) devices. A service processor can include a central processing unit, volatile and nonvolatile memory devices, a network interface controller (NIC), and the like. In an embodiment, the service processor 120 can execute program instructions to implement a virtual network computing (VNC) server 122. The management server 130 is representative of an information handling system located remotely from the server 110 and utilized to facilitate management tasks at server 110. For example, the management server 130 can be associated with an information technology (IT) service provider responsible for providing system administration services at the server 110. The management server 120 is configured to execute program code to implement a VNC client 132. In one embodiment, the insecure network 140 can include the Internet.

A service processor can perform many system management functions, including monitoring system status, performing diagnostic services, facilitating installation of device firmware and other device and server software, and the like. In an embodiment, a service processor is configured to operate independently of the state of a primary central processing unit (CPU) at server 110 and independently of the state of an operating system (OS) installed at the CPU, referred to herein as out-of-band management. A service processor can include a unique Internet Protocol (IP) address and media access control (MAC) address to facilitate communication and interaction with the service processor. A service processor can support one or more interface protocols to allow administrative personnel or other devices and processes to interact with the service processor. For example, a service processor can provide a graphical user interface (GUI) that displays system status and allows an administrator to configure operation of an associated server. Any operation that changes the configuration of a service processor is referred to herein as a transaction. There are many standardized interface protocols in use today, such as VNC, Command Line Interface (CLI), Open Manage Server Administrator (OMSA), Intelligent Platform Management Interface (IPMI), Remote Access Controller Administrator (RACDAM), Web Services-Management (WSMAN) and the like.

Figure 2:
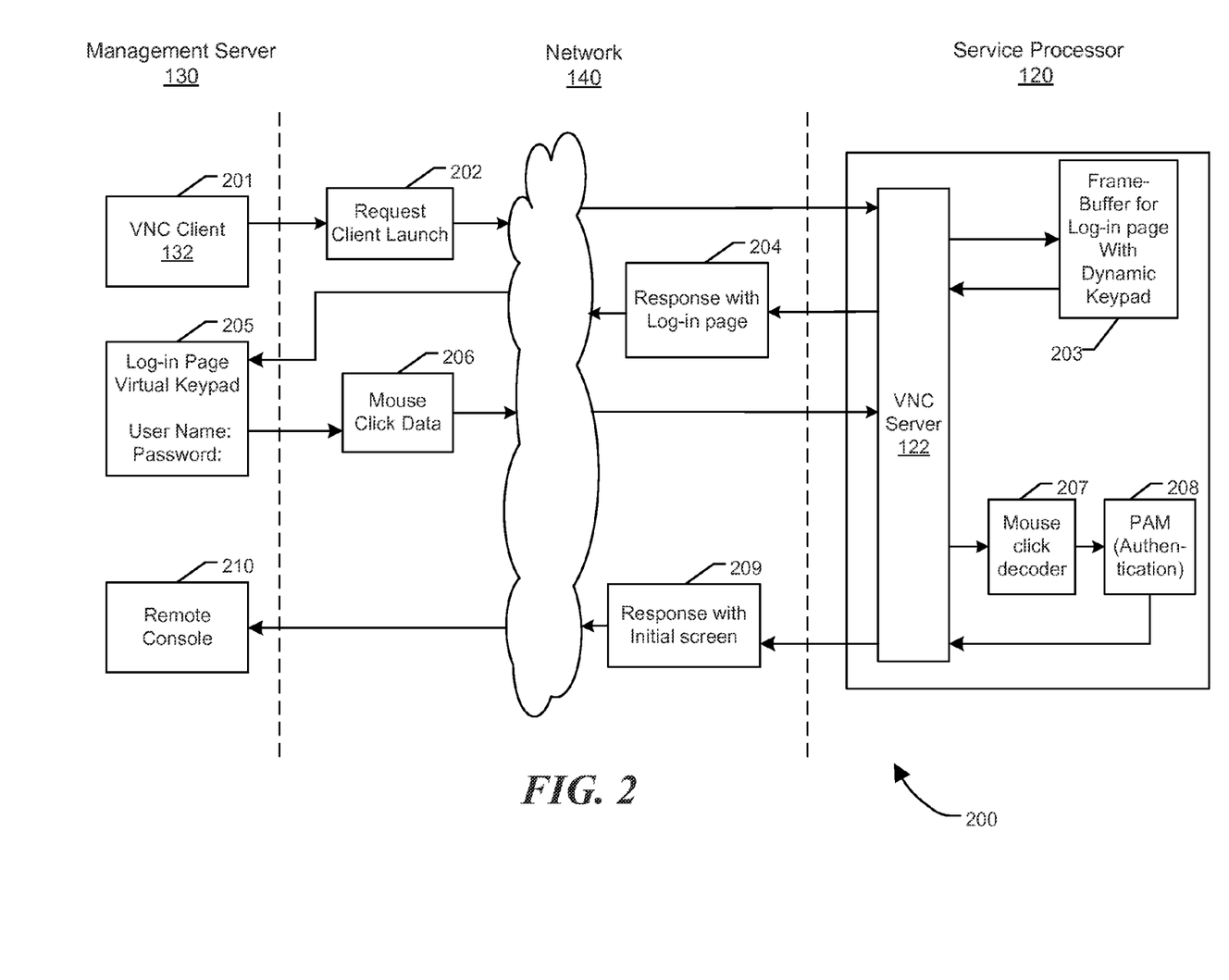
FIG. 2 is a flow diagram illustrating a method for providing secure authentication of a management server according to a specific embodiment of the present disclosure.

FIG. 2 shows a flow diagram 200 illustrating a method for providing secure authentication of a management server according to a specific embodiment of the present disclosure. The diagram 200 includes activities and interactions performed by management server 130 and service processor 120. At block 201, VNC client 132 issues a client launch request 202 over network 140, the request directed to the VNC server 122 at the service processor 120 of server 110. At block 203, a software module of the VNC server generates a frame buffer for a log-in page to be displayed by the VNC client. The log-in page includes a graphical representation of a dynamic keyboard or keypad having randomly generated key designations. At block 204, the VNC server 122 transmits the log-in page to the VNC client at the management server 130 in response to the launch request. At block 205, the log-in page is displayed at the management server 130. One example of the log-in page is illustrated at FIG. 3.

Figure 3:
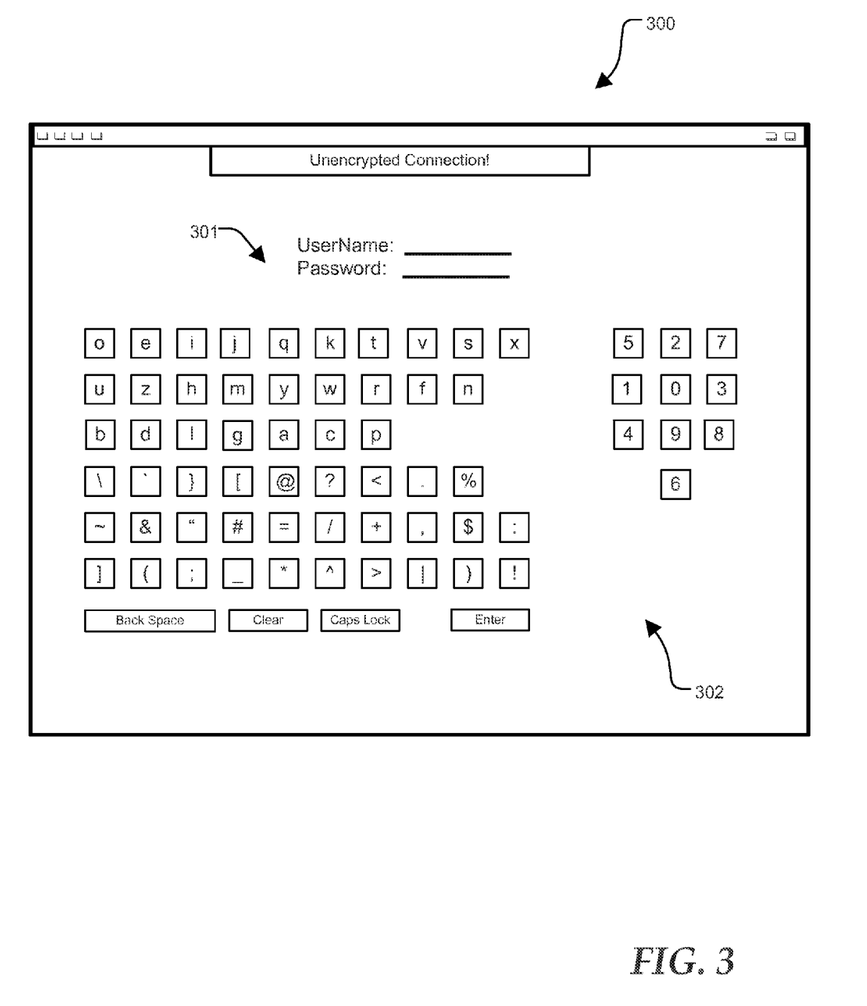
FIG. 3 is a representation of a Virtual network computing (VNC) console at a display device according to an embodiment of the present disclosure.

FIG. 3 is a representation of a VNC console 300 at a display device according to an embodiment of the present disclosure. For example, the management server 130 can include a graphic display device operable to display a VNC client console including a log-in image. The log-in image can include a prompt 301 for entering log-in credentials, such as a user name and a password, and a graphical display of a keyboard 302 including a plurality of individual keys. Each key at keyboard 302 is assigned a corresponding key designation. The key designation assignment is generated randomly in response to the each incoming VNC client launch request received at the VNC server 122. Each time a client launch request is received at the VNC server 122, a log-in image is generated that includes a keyboard 302 having a statistically different key designation mapping. For example, the key assigned to represent the letter "a" would, on average, be assigned to any one of the keys at keyboard 302. The key designations illustrated at FIG. 3 are only for the purpose of example. Different key designations and a different number of keys can be included at the keyboard 302. The VNC server 122 maintains a stored copy of the randomly generated key mapping to facilitate decoding of log-in credentials entered at the VNC client based on a sequence of mouse or other pointing device coordinates received from the VNC client. In another embodiment, the location at the VNC console 300 of the keyboard 302 or one or more individual keys of keyboard 302 can be altered in response to each incoming VNC client launch request.

Returning to FIG. 2, block 205, a user at the VNC client enters their UserName and Password log-in credentials at the VNC console by manipulating a pointing device, such as a mouse, to sequentially select each character of their UserName and Password from the virtual keyboard 302. For example, a user can click the UserName prompt to establish focus to that field, move the mouse to a first key at the keyboard 302 that represents the first character of the UserName and perform a mouse-click, or similar action, to select that key. Each character of the UserName can be selected sequentially in the same manner. At block 206, movements and selections of the pointing device can be communicated by the VNC client 132, over the network 140, to the VNC server 122. For example, the VNC client 132 can provide coordinates of the user's display of the VNC console to the VNC server 122, the coordinates identifying a location of the pointing device at the console. In an embodiment of the present disclosure, the VNC server 122 can disable keyboard stroke detection at a physical keyboard associated with management server 130. For example, the physical keyboard associated with the VNC client can be rendered inoperable until authentication of the client has completed. In another embodiment, explicit selection of individual keys by the user is not necessary. For example, the VNC server 122 can identify keyboard selections based only on movement of the pointing device, identifying key selections based on discontinuities in movement of the pointing device.

At block 207, the UserName and Password values can be decoded based on the transmitted movement and selection information and based on the stored representation of the randomly generated keyboard key-designations. For example, if a user selects a key at the keyboard 302 at a location x,y then the coordinates x,y can be provided to the VNC server 122. The VNC server 122 can determine the key designation associated with a key at that location using the stored representation of the randomly generated keyboard key-designations. The decoding process can be repeated for each character of the log-in credentials. If the VNC server determines that the decoded log-in credentials are correct, the method 200 can proceed to block 208 where the authentication process can be completed. In an embodiment, the VNC server can utilize a pluggable authentication module (PAM) to integrate an authentication scheme at a programming interface of an application. Once authentication is complete, the method proceeds to block 209 where the VNC server 122 can provide an initial remote console screen 210 to the VNC client. For example, a system administrator, having successfully established authentication using the virtual keyboard 302, can be provided with access to the server 110 by way of the service process 120. At no time were actual characters of the log-in credentials transmitted over the network 140. The log-in credentials to establish the VNC service can be the same or can be different from credentials required to access the server 110. For example, additional authentication may be required, after the VNC session has successfully launched, before a user at the management server 130 is given full access to server 110.

Figure 4:
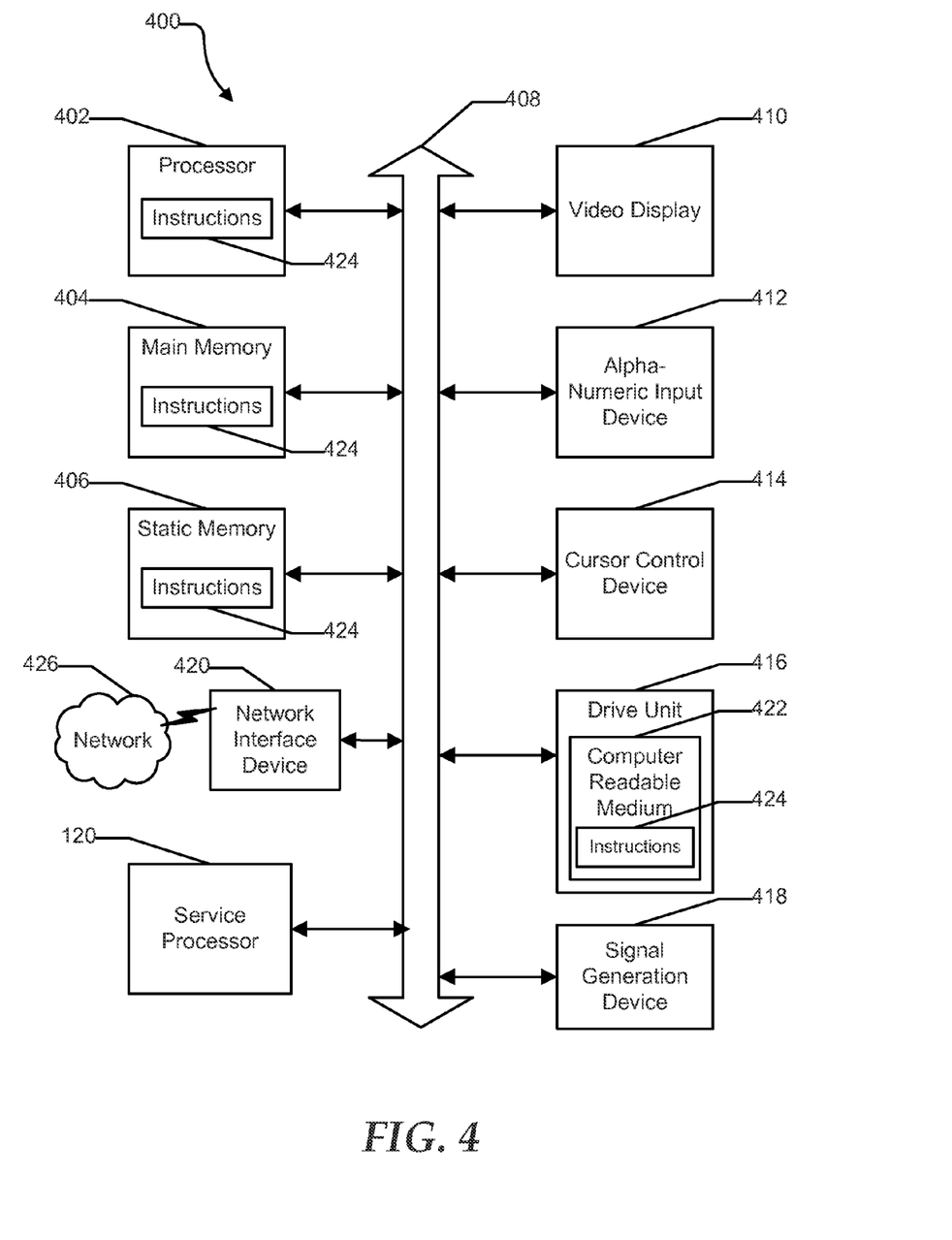
FIG. 4 is a block diagram of an information handling system according to an embodiment of the present disclosure.

FIG. 4 shows an information handling system 400 capable of administering each of the specific embodiments of the present disclosure. The information handling system 400 can represent servers 110 and 130 included at the information handling system 100 of FIG. 1. The information handling system 400 may include a processor 402 such as a central processing unit (CPU), a graphics processing unit (GPU), or both. Moreover, the information handling system 400 can include a main memory 404 and a static memory 406 that can communicate with each other via a bus 408. As shown, the information handling system 400 may further include a video display unit 410, such as a liquid crystal display (LCD), an organic light emitting diode (OLED), a flat panel display, a solid state display, or a cathode ray tube (CRT). Additionally, the information handling system 400 may include an input device 412, such as a keyboard, and a cursor control device 414, such as a mouse. The information handling system 400 can also include a disk drive unit 416, a signal generation device 418, such as a speaker or remote control, and a network interface device 420. The information handling system 400 can include service processor 120, described above. The service processor 120 can include a network interface device (not shown at FIG. 4), or the service processor 120 can utilize network interface device 420 or another device to communicate over the network 140. The information handling system 400 can represent a server device whose resources can be shared by multiple client devices, or it can represent an individual client device, such as a desktop personal computer.

The information handling system 400 can include a set of instructions that can be executed to cause the computer system to perform any one or more of the methods or computer based functions disclosed herein. The computer system 400 may operate as a standalone device or may be connected such as using a network, to other computer systems or peripheral devices.

In a networked deployment, the information handling system 400 may operate in the capacity of a server or as a client user computer in a server-client user network environment, or as a peer computer system in a peer-to-peer (or distributed) network environment. The information handling system 400 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single information handling system 400 is illustrated, the term "system" shall also be taken to include any collection of systems or sub-systems that individually or jointly execute a set, or multiple sets, of instructions to perform one or more computer functions.

The disk drive unit 416 may include a computer-readable medium 422 in which one or more sets of instructions 424 such as software can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the information handling system 400. The main memory 404 and the processor 402 also may include computer-readable media. The network interface device 420 can provide connectivity to a network 426, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal; so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
receiving, at a Virtual network computing (VNC) server, a client launch request from a VNC client;
providing a log-in page for display at the VNC client in response to receiving the client launch request, the log-in page including display of a graphical representation of a keyboard having a plurality of keys, wherein individual key designations are unique and generated randomly in response to the client launch request; and
receiving, at the VNC server, pointer device movement coordinates from the VNC client, the movement coordinates indicating selection of individual keys at the keyboard by a user of the VNC client.

2. The method of claim 1, further comprising:
storing the randomly generated key designations at a memory device associated with the VNC server; and
decoding the pointer device movement coordinates to determine log-in credentials provided by the user based on the stored key designations.

3. The method of claim 1, wherein the VNC server is a process executed at a service processor included at an information handling system.

4. The method of claim 3, wherein the VNC client is associated with a remote management server, the VNC client to establish authorized access at the information handling system.

5. The method of claim 1, further comprising receiving the client launch request over an un-encrypted communication network.

6. The method of claim 1, further comprising receiving the pointer device movement coordinates from the VNC client over an un-encrypted communication network.

7. The method of claim 1, further comprising authenticating log-in credentials associated with the VNC client based on the pointer device movement coordinates received from the VNC client.

8. The method of claim 1, further comprising disabling keyboard stroke detection at a physical keyboard associated an information handling system executing the VNC client.

9. An information handling system comprising:
a network interface device; and
a service processor, the service processor to implement a Virtual network computing (VNC) server, the VNC server to:
receive, using the network interface device, a client launch request from a VNC client;
provide a log-in page for display at the VNC client in response to receiving the client launch request, the log-in page including display of a graphical representation of a keyboard having a plurality of keys, wherein individual key designations are generated randomly in response to the client launch request so that each key of the keyboard displays a unique key designation value; and
receive pointer device movement coordinates from the VNC client, the movement coordinates indicating selection of individual keys at the keyboard by a user of the VNC client.

10. The information handling system of claim 9, wherein the VNC server is further to:
store the randomly generated key designations at a memory device associated with the VNC server; and
decode the pointer device movement coordinates to determine log-in credentials provided by the user based on the stored key designations.

11. The information handling system of claim 9, wherein the VNC client is associated with a remote management server, the VNC client to establish authorized access at the information handling system.

12. The information handling system of claim 9, wherein the VNC server is further to receive the client launch request over an un-encrypted communication network.

13. The information handling system of claim 9, wherein the VNC server is further to receive the pointer device movement coordinates from the VNC client over an un-encrypted communication network.

14. The information handling system of claim 9, wherein the VNC server is further to authenticate log-in credentials associated with the VNC client based on the pointer device movement coordinates received from the VNC client.

15. The information handling system of claim 9, wherein the VNC server is further to disable keyboard stroke detection at a physical keyboard associated an information handling system executing the VNC client.

16. A non-transitory storage medium embodying a software program, the software program comprising instructions executable by a processor to implement a Virtual network computing (VNC) server, the VNC server to:

receive a client launch request from a VNC client;

provide a log-in page for display at the VNC client in response to receiving the client launch request, the log-in page including display of a graphical representation of a keyboard having a plurality of keys, wherein each key of the keyboard is assigned a corresponding key designation, the key designation assignment generated randomly in response to the client launch request; and receive pointer device movement coordinates from the VNC client, the movement coordinates indicating selection of individual keys at the keyboard by a user of the VNC client.

17. The non-transitory storage medium of claim 16, wherein the VNC server is further to:

store the randomly generated key designations at a memory device associated with the VNC server; and decode the pointer device movement coordinates to determine log-in credentials provided by the user based on the stored key designations.

18. The non-transitory storage medium of claim 16, wherein the VNC server is a process executed at a service processor included at an information handling system.

19. The non-transitory storage medium of claim 16, wherein the VNC client is associated with a remote management server, the VNC client to establish authorized access at the information handling system.

20. The non-transitory storage medium of claim 16, wherein the VNC server is further to receive the client launch request over an un-encrypted communication network.

* * * * *